United States Patent [19]

Ehrenberg

[11] Patent Number: 5,325,748

[45] Date of Patent: Jul. 5, 1994

[54] PROFILE CUTTING TOOL

[75] Inventor: Harry Ehrenberg, Haifa, Israel

[73] Assignee: Neumo Grundbesitz-GmbH, Fed. Rep. of Germany

[21] Appl. No.: 976,961

[22] Filed: Nov. 16, 1992

[30] Foreign Application Priority Data

Nov. 14, 1991 [DE] Fed. Rep. of Germany ....... 4137467

[51] Int. Cl.$^5$ ............................ B23G 5/18; B23C 5/12
[52] U.S. Cl. ........................................... 82/13; 407/29; 407/42; 407/114
[58] Field of Search ............... 82/13; 407/29, 42, 113, 407/114

[56] References Cited

U.S. PATENT DOCUMENTS

| 221,552 | 11/1879 | Hanson | 82/13 |
|---|---|---|---|
| 2,586,235 | 2/1952 | Krafft | 82/13 |
| 4,531,863 | 7/1985 | Smith | 407/113 |
| 4,531,864 | 7/1985 | Bylund | 407/114 |
| 4,572,713 | 2/1986 | Schmidt | 407/114 |
| 4,729,697 | 3/1988 | Lacey | 407/42 |
| 4,784,537 | 11/1988 | Baker | 408/222 |
| 4,790,693 | 12/1988 | Koblesky | 407/35 |
| 4,831,674 | 5/1989 | Bergstrom et al. | 10/140 |
| 4,913,604 | 4/1990 | Zaengerle | 409/74 |
| 4,936,719 | 6/1990 | Peters | 407/42 |
| 4,943,191 | 7/1990 | Schmitt | 408/1 R |
| 5,059,069 | 10/1991 | Lagerberg | 82/13 |
| 5,080,538 | 1/1992 | Schmitt | 409/66 |
| 5,098,232 | 3/1992 | Benson | 407/33 |

FOREIGN PATENT DOCUMENTS

| 0274027 | 7/1988 | European Pat. Off. . |
| 0278930 | 8/1988 | European Pat. Off. . |
| 0429917 | 6/1991 | European Pat. Off. . |
| 593531 | 2/1934 | Fed. Rep. of Germany . |
| 3828780 | 3/1990 | Fed. Rep. of Germany . |
| 4010075 | 10/1991 | Fed. Rep. of Germany . |
| 2431897 | 3/1980 | France ................. 407/114 |

OTHER PUBLICATIONS

De-Z. Jensko, N.: Profilfraser-ein uberholter Werkzeugtyp? In: Werkstatt und Betrieb, 92. Jg., 1959, H. 5, S.275-278.
CH-Z: Technica Jul. 1991, S.50.

Primary Examiner—William E. Terrell
Attorney, Agent, or Firm—Quarles & Brady

[57] ABSTRACT

A thread cutter has a set thread cutting tip for forming a pitch on a workpiece. The cutting projections that form the cutting edge are staggered by a few radians about the rotational axis of the cutter, so that they do not simultaneously come into cutting engagement with the workpiece surface and instead engages the surface in a predetermined sequence, leading to safe loading and improved machining accuracy.

18 Claims, 4 Drawing Sheets

PROFILE CUTTING TOOL

BACKGROUND OF THE INVENTION

The invention relates to a profile cutting tool, which has at least one profile blade appropriately extending in a longitudinal direction and which forms two or more juxtaposed cutting projections or between the latter cutting depressions extending in the longitudinal direction, so that the overall profile of the profile blade can be imaged on a planar, curved or similar workpiece surface by metal removing or similar machining.

Particularly if the profile blade has cutting edges at least partly formed from a homogeneous material or not by a single grain size, they appropriately define a blade front surface, a blade back surface and lateral flanks of the cutting projections or depressions. The front and back surfaces are then in a clearly defined cutting angle to one another in cross-section through the cutting edge or transversely to the main longitudinal direction thereof, whilst the back surface can define a clearance angle relative to the workpiece surface and the front surface a positive or negative setting angle relative to said workpiece surface. The said angles are dependent on the material to be worked, the material of the profile blade, the cutting speed, the surface characteristics to be produced and the like.

In order to e.g. simultaneously produce several juxtaposed grooves, which optionally pass into one another continuously through an advance movement, such as the individual thread elements of a single or multiple thread, use can be made of a corresponding profile tool and the latter can be gradually brought into engagement with the workpiece as a result of the advance roughly parallel to the main longitudinal direction. Thus, the furthest forward cutting projection in the advance direction takes on the most important work, so that the following cutting projections have to do less cutting. As a result of the increasing lower construction of the cutting projections in the direction of the furthest forward cutting projection this disadvantage can be reduced, but the cutting projections only gradually engage with the workpiece due to the advance movement, so that long operating times occur.

This can be counteracted in that the workpiece is simultaneously brought into the working area of two or more cutting projections or cutting depressions, which can have roughly the same profile height, by an in-feed at right angles to the main longitudinal direction of the cutting edge or to the advance movement or to the working or cutting movement at right angles thereto. However, said projections and depressions simultaneously engage with the workpiece, which causes a sudden loading of the corresponding portion of the profile blade or the entire blade. This is particularly the case with those tools which, unlike in the case of profile drills, such as tap drills, are not uniformly circumferentially in engagement with the workpiece and instead in the same way as a peripheral cutter, a gouging profile tool or the like during each operating cycle, e.g. during each rotation, are out of engagement over a larger path and in engagement with the workpiece over a smaller path until the machining is ended on terminating a large number of operating cycles as a result of the advance movement and/or an in-feed. An advance movement is also mainly directed roughly identically or oppositely to the cutting direction, depending on whether conventional or non-conventional cutting is taking place.

OBJECTS OF THE INVENTION

An object of the invention is to provide a cutting tool, in which the disadvantages of known constructions or of the described types are avoided and which in particular reduces the stresses when engaging in the workpiece.

SUMMARY OF THE INVENTION

According to the invention means are also provided so that the profile blade only gradually engages with the workpiece if, with respect to the latter it substantially exclusively performs its cutting movement. Thus, adjacent longitudinal portions of the same profile blade or adjacent cutting projections and/or cutting depressions can be successively engaged with the workpiece independently of the profiling and in this way the sudden loading of the profile blade is significantly reduced. For example, a profile projection running on a curved path, which traverses the workpiece on the latter from a minimum to a maximum and back to a minimum of a depth of cutting engagement, can have reached or passed the maximum before the next cutting projection has come into a significant or stronger loading engagement with the workpiece. Thus, it is possible to significantly reduce the load reversal on the tool.

The sequence with which the cutting projections engage can also be used to ensure that on the workpiece or the profile blade act force vectors of constant or varying dimension and/or size roughly parallel to the main longitudinal direction thereof and which are used for stabilizing the tool, the workpiece and/or the mounting thereof.

In a preferred embodiment several substantially identically large cutting projections or depressions succeed one another in the manner of a tooth system in the main longitudinal direction, which with respect to the direction of the cutting movement transverse or at right angles thereto is inclined by an acute angle of e.g. significantly less that 30° or 20° diverging from the right-angled position. Thus, in simple manner the outer ends of the cutting projection projecting by the same distance or the same base faces of the cutting depressions set back by the same distance and which can in each case be formed by tips, are staggered in the described manner.

If the back surface of at least one portion of the profile blade is not at right angles to the cutting direction, but is instead so inclined with respect thereto that the outer end of the cutting projection first engages with the workpiece, then the flanks of this cutting projection, which can simultaneously be the flanks of adjacent cutting depressions, also only gradually over their length come into cutting engagement, so that the individual cutting projection is protected. For example, the back surface can be formed by a hollowed out chip chute, which is approximately planar in the vicinity of the cutting profiling and space therefrom is cross-sectionally concave.

The construction according to the invention is also suitable for those cutting tools, in which the cutting edge is constructed in one piece with a tool shank, as well as for cutting tools with a separate cutting body fixed to the shank, e.g. a cutting tool tip fixed by soldering or the like, or even an interchangeably fixed through-away cutting tool tip. The cutting body can be inclined with respect to the shank in accordance with the inclination of the profile blade and/or can undergo a thickness modification corresponding to the inclination. Particularly with a substantially constant thickness the cutting body can by a setting deformation of a material strand having approximately constant cross-sections can be given the shape which is necessary for the offset position of the cutting projections. The material strand deformed about its longitudinal central axis in the manner of a steep helix can be subdivided into individual cutting bodies by separation along a longitudinal median plane and/or by separating longitudinal portions.

Said angles can differ over the length of the profile blade or in the vicinity of cutting projections or depressions, e.g. in such a way that in the centre of the profile blade length the theoretically optimum angles are obtained and they vary slightly towards the profile blade ends, which permits a particularly simple manufacture or resharpening of the back or front surfaces. Even in the case of an approximate constancy of the angle over part or the entire length of the profile blade, in particular the outer terminal edges of the cutting projections and/or the base surfaces of the cutting depressions can be in a common envelope surface, which is e.g. cylindrical and whose axis at a rotation cutting tool appropriately coincides with the axis thereof or traverses the cutting body in the vicinity of the centre of its length centrally between the remote body surfaces which form with an edge surface at both sides of the cutting body a cutting edge in each case. Instead of being convex the back surface can at least partly be concave, planar, V-shaped or in the form of a straight-set surface.

BRIEF FIGURE DESCRIPTION

These and further features can be gathered from the claims, description and drawings and individual features, both singly and in random subcombinations, can be realized in an embodiment of the invention and in other fields and can represent advantageous, independently protectable constructions for which protection is hereby claimed. Embodiments of the invention are described in greater detail hereinafter relative to the drawings, wherein show:

FIG. 1 A cutting tool according to the invention in a detail view.

FIG. 1a A perspective view of a cutting insert according to the invention.

FIG. 2 A cross-section through the cutting tool of FIG. 1.

FIGS. 3 to 10 Further embodiments of profile blades in a simplified view.

DETAILED DESCRIPTION OF PREFERRED EXAMPLE EMBODIMENTS

Figure 1:
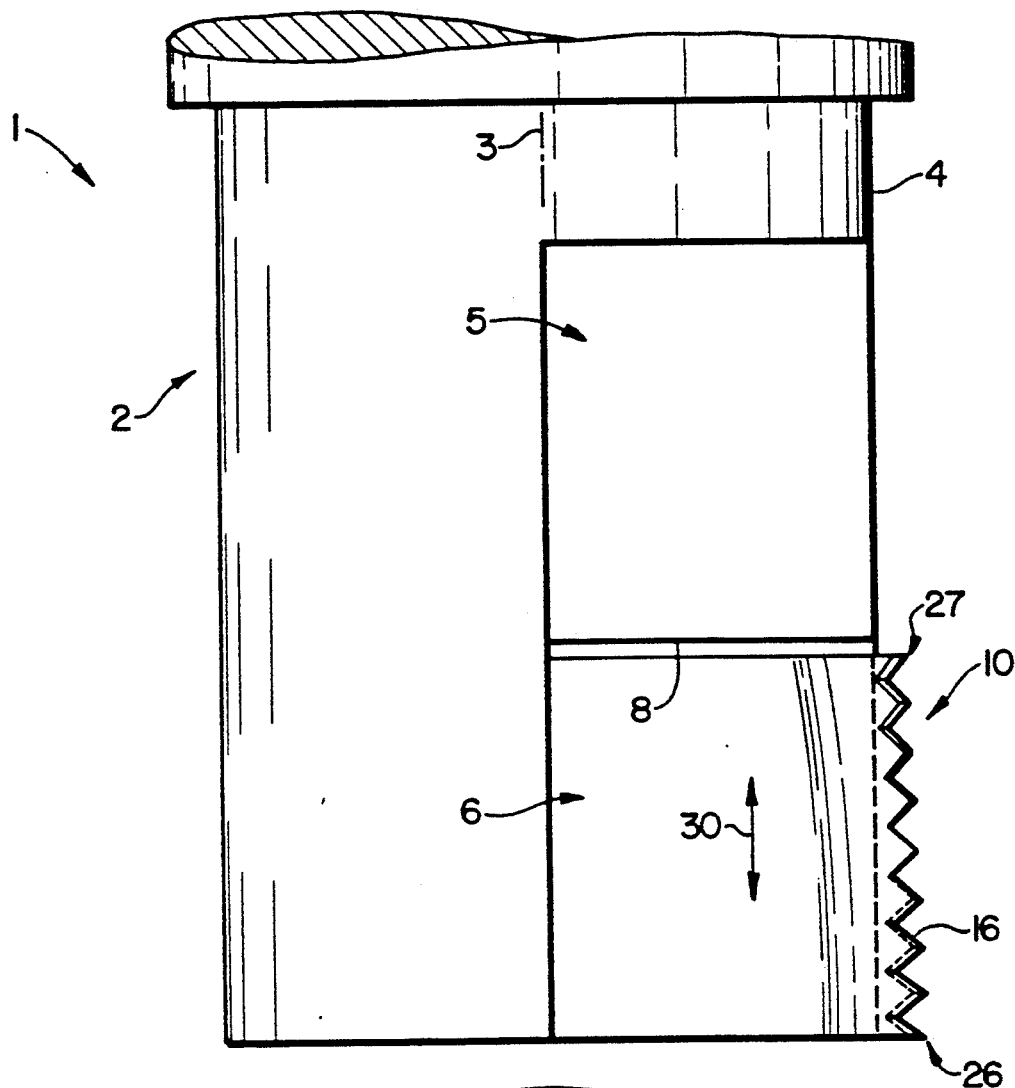

The cutting tool 1 has a shank 2 which is substantially constructed as a body of revolution and is approximately cylindrical in the cutting region and whose central axis defines a rotation axis, which coincides with the axis of the casing 4 of the shank in the cutting region and/or in its fixing region for connection to a machine spindle.

In the cutting region provided on one shank end and extending at least to the latter, the shank 2 has on the circumference a recess 5, which passes approximately continuously from the free end face of the shank over a longitudinal region, which is as large or larger than the associated extension of the cutting region. This cutting region is defined by at least one or a single cutting body 6, which is e.g. made from very hard, dimensionally stable, brittle sintered material. For said cutting body 6 the recess 5 cross-sectionally bounded by two angle flanks forms with one angle flank a bearing surface 9 on which the cutting body 6 is supported against the cutting pressure acting on its profile blade 10.

Figure 1A:
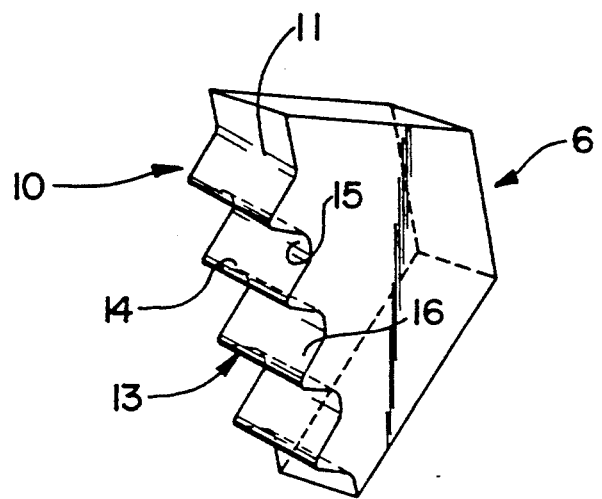

Referring to FIGS. 1 and 1a together, the profile blade 10 forms a cutting edge profiled backwards and forwards in alternating directions and whose flanks in each region are bounded by a front surface extending transversely to the cutting direction 20 and by a back surface 13 located roughly in the cutting direction 20. Through its profiling the cutting edge 11 forms more than three, staggered adjacent cutting projections 14 or cutting depressions 15, namely e.g. the cross-sectional profile of a V-thread, round thread, acme thread, etc. to be cut. Both laterally outer flanks 16 of each cutting projection 14 simultaneously form inner flanks of two adjacent cutting depressions 15. Instead of a single profile blade they can also be two or more cutting edges 11 uniformly distributed around the rotation axis 3 and which are formed by the same or separate cutting bodies 6 and which are appropriately so arranged that they successively come into cutting engagement during the same machining operation in accordance with the rotation of the cutting tool 1.

At least in the vicinity of the outermost pointed end faces of the cutting projections 14 or the deepest angle zones of the cutting depressions 15 the back surface 13 of the cutting edge 11 is appropriately under a clearance angle 18 such that only the cutting edge 11, but not the back surface 13 can engage with the workpiece. However, the front surface 12 is under a front angle 19 to the engaging area of the workpiece surface 21 to be machined. The front surface 12 and back surface 13 are appropriately under an acute blade angle 17 to one another, the sum of the three said angles amounting to 180°. The breast or front face 12 is at least partly concavely arcuated in cross section or recessed to provide a chip guiding or chip breaking surface or to provide a thinnest section of the plate body 6 connecting to the blade or cutter 10. In the represented embodiment the workpiece surface 21 is an inner circumferential surface for producing an internal thread, but can also be an outer circumferential surface for producing an external thread. On placing through the cutting edge 11 an axial plane of the central axis of the workpiece surface 21 eccentric to the rotation axis 3 or a tangential plane at right angles to said axial plane, then it forms the base plane for said angles. However, the cutting direction 20 is defined as the tangential direction to the rotation axis 3 in such a way that it is substantially at right angles to the axial plane of the rotation axis 3 passing through the cutting edge 11.

The cutting edge 11, which extends over a longitudinal portion of the shank 2 parallel to the rotation axis 3, is not in a single axial plane of the rotation axis 3, but instead in one or more planes diverging therefrom. However, this does not refer to those divergences which occur if the front surface 12 is not in one of the said axial planes and therefore areas of the cutting edge 11, which have different radial spacings from the rotation axis 3, are also staggered with respect to the axial plane placed through the cutting edge 11.

Instead a portion of the cutting edge 11 extending over two, three or more cutting projections 14 and/or cutting depressions 15 is located in a main longitudinal direction 30, which diverges from the axial direction of the rotation axis 3 in such a way that areas of the cutting edge 11 which have the same radial spacings from the rotation axis 3 are staggered transversely to said axial plane or in the cutting direction 20. Thus, e.g. the radially outermost end faces or edges of all the cutting projections 14 and also the deepest bottom areas of all the cutting depressions 15 are on a common flight circle 25 about the rotation axis 3. In the longitudinal direction adjacent portions of the front surface, which e.g. extend over one or more cutting projections 14 and/or cutting depressions 15, can also be stepped or in other ways offset from one another.

According to FIG. 1 the end 26 of the cutting edge 11 belonging to the free shank end is set back from the other end 27 in the circumferential direction of the flight circle 25 or counter to the cutting direction 20, in which zones of the cutting edge 11 with the same radial spacings from the rotation axis 3 are substantially located on a continuous line from one end to the other and which is located in the manner of a steep helix under a few radians inclined to the rotation axis 3. Thus, the areas with the same radial spacings come in progressively succeeding manner and not simultaneously into engagement with the workpiece surface 21. If the arc angle related to the rotation axis 3 or the central axis of the workpiece surface 21 and over which the particular cutting projection 14 is in engagement with the workpiece surface 21, is roughly the same as or larger than 90°, then compared with the arc angle over which the entire cutting edge 11 extends, it is appropriately less than a ½ or at least a ¼ smaller. Thus the furthest to the rear region of the cutting edge counter to the cutting direction 20 comes into engagement with the workpiece surface 21, when the furthest forward area in the cutting direction 20 has not achieved the deepest engagement in the workpiece, has just achieved it or has just left it, as a function of the requirements made on the machining operation.

It is important that the flight circle 25 of the profile blade 10 can be simultaneously engaged with the workpiece surface 21 over the entire length of the profile blade 10 by adjustment at right angles to the rotation axis 3, so that the thread can be produced in a single rotation of the tool about the central axis of the workpiece surface 21.

The profiling formed by the cutting projections 14 and cutting depressions 15 passes over the entire associated edge face 31 of the cutting body 6, which can therefore be connected over one of two identical cutting edges 11 to the tip or body faces 22, 23 of the cutting body 6 positioned transversely thereto. The profilings of the edge face 31 in each cut are transverse to the rotation axis 3 roughly at right angles to the median plane 28 of said cross-section or, compared therewith, with a pitch corresponding to the thread pitch provided.

In cross-section the edge face 31 forming the back surface 13 can be linear or at right angles to the median plane 28 and in this case for maintaining a constant clearance angle has a setting or helically curved path over the entire length of the profile blade 10. However, the edge face 31 can also be concave or convex in cross-section and in particular curved about an axis located in the median plane 28, the radius of curvature being roughly the same as the radius of the flight circle 25. In each case the profiling or the edge face 31 in the particular cross-section is symmetrical to the associated median plane 28.

If the cutting projections 14 or cutting depressions 15 have a constant cross-sectional height over their entire profile length, then the same criteria apply for the bottom surfaces of the depressions 15 as described relative to the outer end faces of the projections 14, i.e. said end faces and bottom faces are provided in equispaced envelope surfaces.

With one of its two largest body faces 22 the cutting body 6 is uniformly or in full-surface manner supported on the bearing surface 7 and in each area of its length the associated median plane 28 is advanced in the cutting direction 20 compared with the parallel axial plane 29 of the rotation axis 3, so that said clearance angle 18 is obtained. With its edge face 24 remote from the edge face 31 the cutting body 6 can be supported on the bearing surface 9. The cutting body 6 with one or both end faces positioned transversely to the rotation axis 3 can be supported on corresponding shoulder faces 8 of the shank 2 and said planar end or lateral faces can be at an angle to one another.

Instead of constructing the cutting body 6 with approximately rectangular contours according to FIG. 1, they can preferably be trapezoidal in such a way that the profile blade 10 is located on the longest base edge of said profile plate. Advantageously the cutting body 6 is provided in the centre with a through bore for a tightening screw positioned transversely to the body faces 22, 23 and with which it is possible to tighten it against the bearing surface 7. The cutting body 6 can also be provided with at least one further profile blade on the edge face remote from the profile blade 10 or on one or both edge faces positioned transversely thereto and said further blade can either have the same construction as the profile blades 11 according to FIGS. 1 and 2, or can be constructed differently thereto, e.g. according to at least one of the FIGS. 3 to 10.

In a linear development the ends 26, 27 of the profile blade 10 are appropriately symmetrical to the median plane between them. These ends can in each case be formed by part of a cutting projection, which then e.g. has a flank roughly at right angles to the rotation axis 3 and emanating from its apex. The particular end can also be formed by the deepest area of a bottom face of a cutting depression 15.

For producing a profiling in the workpiece surface 21 the cutting tool 1 is fixed in overhung manner with a shank in a working spindle of a machine tool, whilst the workpiece is fixed in a rotatable holding fixture roughly axially parallel thereto. The cutting tool 1 is firstly moved axially and in contact-free manner relative to the workpiece surface 21 in the machining area thereof and is rotated with a much higher circumferential speed than the workpiece surface 21. The profile blade 10 and workpiece surface 21 are now fed radially to one another until the envelope surface or flight circle 25 cuts over the workpiece surface corresponding to the desired depth of the profiling to be produced. During each rotation of the cutting tool 1 all the front areas of the cutting edge in the cutting direction 20 are once engaged and once disengaged with the workpiece surface 21 and perform an arcuate path eccentric to the workpiece axis. If the inner profiling is to have a pitch like a thread, then the cutting tool 1 and workpiece surface 21 are, during a single rotation of said workpiece surface, adjusted against one another by the pitch of a thread of 360° synchronously with the workpiece rotation. After the inner profiling has been produced by cutting or milling, the workpiece surface 21 and the profile blade 10 are firstly moved radially apart and then axially disengaged.

FIGS. 3 to 10 show the cutting tool in a view of the edge face 31 and not on the body face 23, as in FIG. 1. Whereas in FIGS. 1 and 2 the rear end 27 is in front of the front end 26 in the cutting direction 20, according to FIG. 3 the front end 26a is set back counter to the cutting direction 20a. Instead of offset the cutting body 6a is approximately plate-like, so that substantially planar, parallel body faces 22a, 23a are obtained. However, the profile body 10a is constructed in such a way that its central line roughly parallel to the main longitudinal direction has constant radial spacings from the rotation axis, i.e. passes helically round the same, although it is located roughly in one plane.

Figure 2:
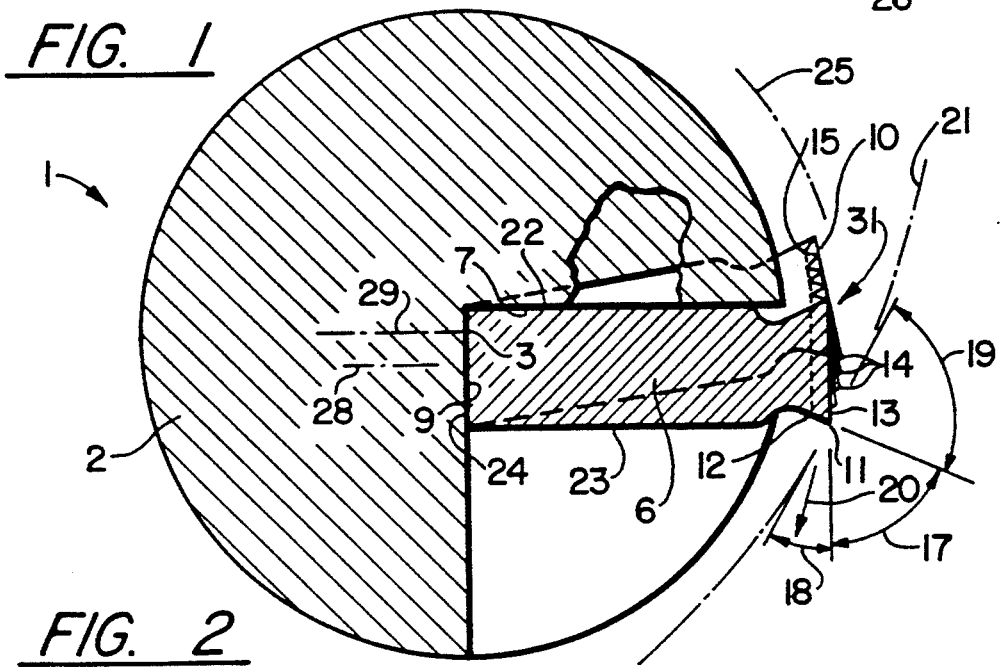
Figure 3:
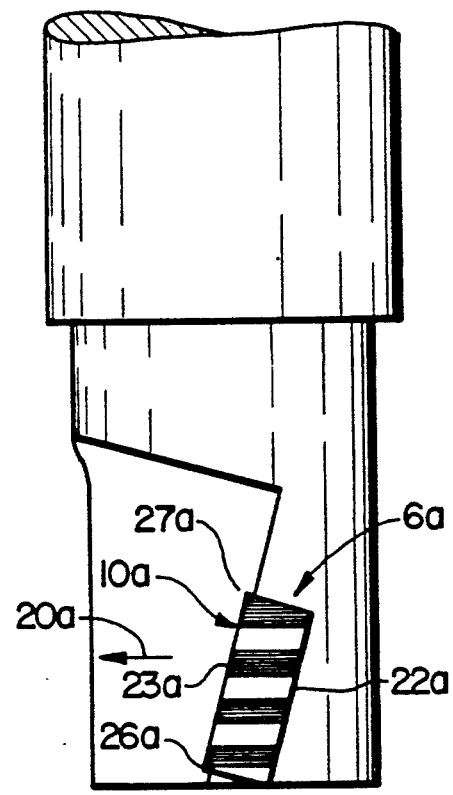
Figure 4:
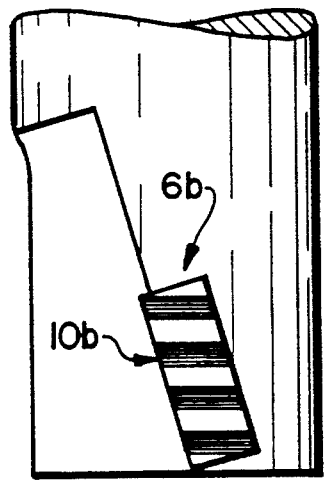

According to FIG. 4 the cutting body 6b or the profile blade 10b is positively inclined according to FIGS. 1 and 2 and not negatively according to FIG. 3, the cutting body 6 once again having a substantially planar, plate-like construction. The cutting body 6b or body surface 22c can also be approximately axially parallel to the rotation axis 3 according to FIG. 5 and at least the front surface 12c or the entire associated body surface 23c remote therefrom can be inclined in the described manner. It can also be located in one plane or have a setting curvature.

Figure 5:
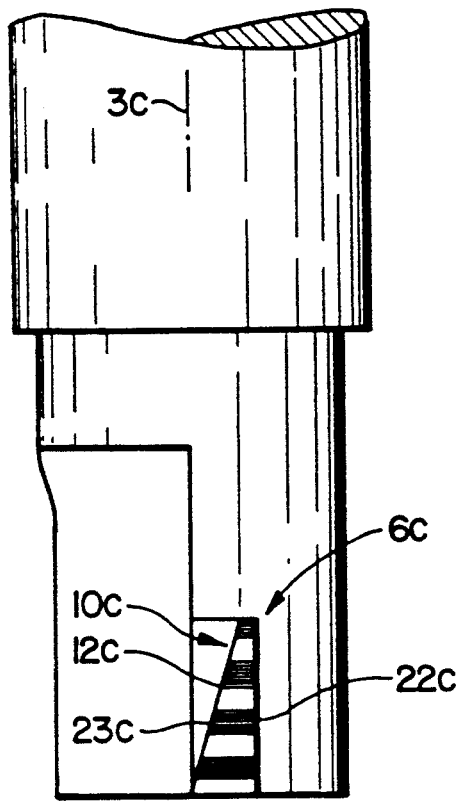
Figure 6:
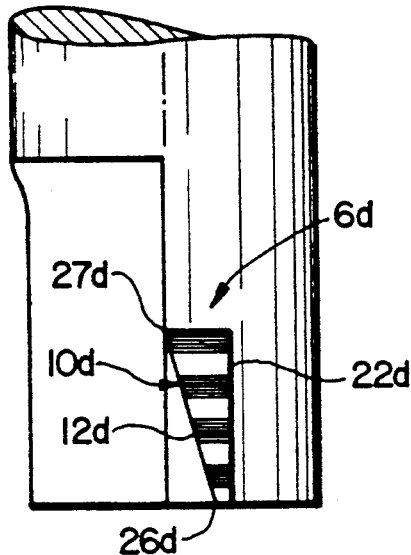

Whereas according to FIG. 5 the profile blade 10c again has a negative inclination, the profile blade 10e according to FIG. 6 has a positive inclination, i.e. not its front end 26d, but its back end 27d first comes into cutting engagement with the workpiece surface and then the cutting engagement spreads towards the front end 26d over the entire length of the profile blade 10d.

Whereas with the linear profile blade 10c or 10d according to FIGS. 5 and 6, said spread as a function of the rotary movement of the cutting tool takes place linearly or uniformly, with a profile blade construction diverging from the linear construction in accordance with FIGS. 7 to 10 it can also take place progressively or degressively. According to FIG. 7 the profile blade 10e is e.g. substantially uniformly concave, so that its pitch following on to the front end 26e is larger than in the vicinity of the rear end 27e. Thus, firstly the front end 26e comes into cutting engagement and this initially spreads slowly and then more quickly towards the rear end 27e.

Figure 8:
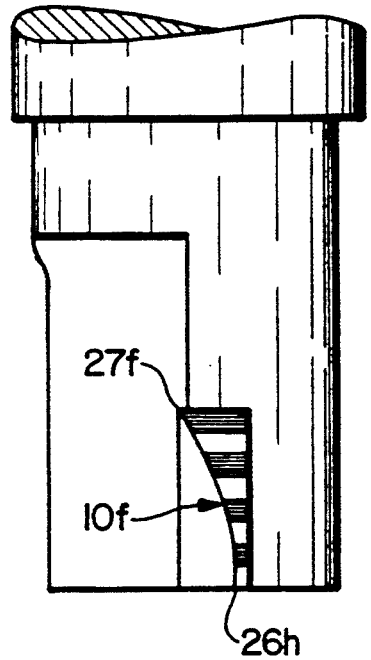

In the embodiment according to FIG. 8 firstly the rear end 27f comes into cutting engagement and this then spreads slowly and then increasingly more quickly towards the front end 26f, because unlike the profile blade 10e, here the profile blade 10f is positively inclined.

Through the nature and uniformity or non-uniformity of the inclination of the profile blade, for each spread state of the cutting engagement determination takes place of the forces which act through the cutting engagement on the cutting body, the bearing surfaces 7 to 9 supporting the same and the shank 22. For example, the cutting body can be loaded against or away from the shoulder 8, as a function of the nature of any clearance to be compensated in the tool mounting and/or in the workpiece mounting.

Figure 9:
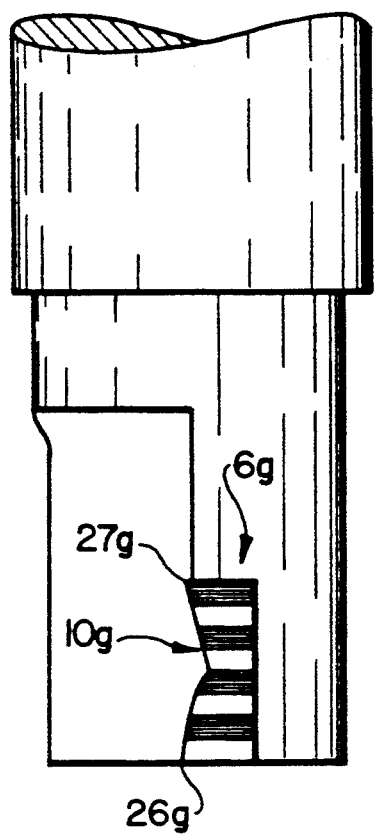
Figure 7:
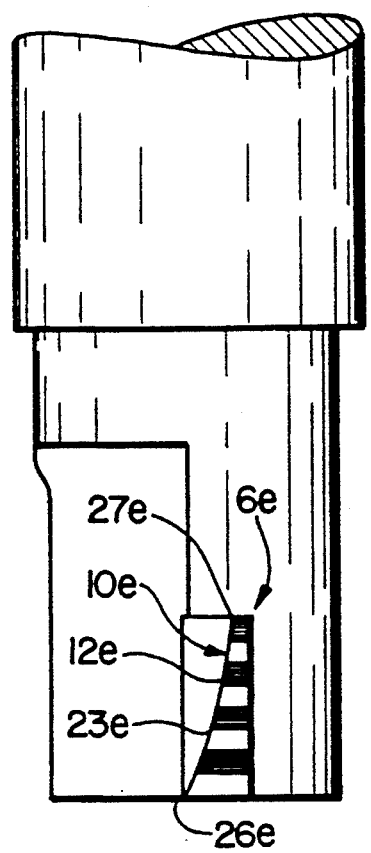

As shown in FIG. 9 the cutting edge 10g can simultaneously or in directly succeeding manner come into cutting engagement with two regions, which have a larger spacing than the pitch, can be spaced from at least one of the ends 26g, 27g, or can be formed by said ends. The profile blade 10g then runs according to FIG. 9 from one or both ends counter to the cutting direction approximately linearly, convex and/or concave in the direction towards the centre of its length and its furthest set back region can be located in the same or outside the centre. As a result of this construction a more uniform loading of the cutting body or cutting tool and the workpiece is obtained.

Figure 10:
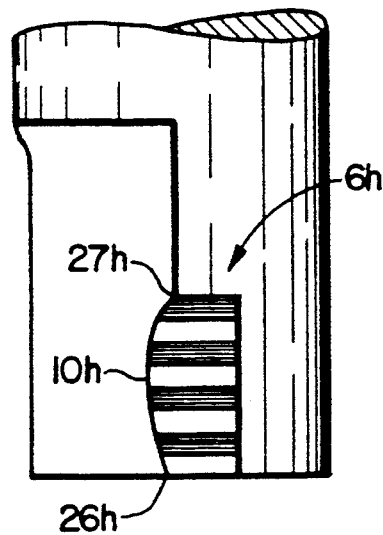

According to FIG. 10 the profile blade 10h can be brought centrally or eccentrically between its ends 26h, 27h firstly into cutting engagement, e.g. in that in a view on its cutting edge face between the ends it forms a single or several convex arcs. The cutting engagement then spreads from a central region towards both ends.

In FIGS. 1 to 10 corresponding parts are given the same reference numerals and consequently all the description parts apply to all the embodiments. For reasons of simplification only further mixed forms of these embodiments are not shown, although each profile blade can have a longitudinal portion in random combination of a random number of embodiments. In addition, a single cutting tool can have several profile blades of this type in and/or out of the working position and which can have the same or a different construction. Further blade shapes are obtained if the represented or described constructions are considered as a negative form of the particular blade.

I claim:

1. A profile cutting tool for cutting workpiece profiles, comprising:

a cutting insert (6) including a plate body, said plate body having a plate section, said plate section having a substantially constant thickness, said plate body having plate surfaces including an edge face (31) and first and second side faces (22, 23) connected to said edge face (31), said first and second side faces being larger than said edge face, said edge face and at least one of said first and second side faces providing a cutting edge (11) at their junction, at least one of said first and second side faces providing a cutting breast face (12), said plate body defining a median plate plane (28) parallel and equidistant between said side faces (22, 23), said edge face (31) being oriented substantially at right angles to said median plate plane (28), said edge face providing a back face (13) adjacent said cutting edge (11), said cutting edge (11) defining a longitudinal edge extension (30), said cutting edge (11) and said edge face (31) providing cutting profiles (14, 15) including at least one profile projection (14) and at least one profile depression (15), said cutting profiles (14, 15) having a longitudinal profile extension, said longitudinal profile extension being transverse to said median plate plane (28), wherein said longitudinal profile extension is inclined with respect to said longitudinal edge extension (30).

2. The tool according to claim 1, wherein a cutting direction (20) transverse to said plate plane (28) is defined, said longitudinal profile extension being substantially parallel to said cutting direction (20).

3. The tool according to claim 2, wherein said cutting profiles (14, 15) are provided for cutting a thread having a thread pitch, a cutting direction (20) transverse to said median plate plane (28) being defined, said longitudinal profile extension being inclined by said thread pitch.

4. The tool according to claim 3, further comprising a tool shaft (2), said tool shaft (2) having an insert reception (5) into which said cutting insert (6) is inserted, said tool shaft (2) having a central longitudinal shaft axis (3) and an axial plane (29) including said shaft axis, said axial plane intersecting said cutting edge (11), said cutting insert being capable of cutting in a cutting direction (20) transverse to said axial plane (29), said first side face (23) and said edge face providing said cutting edge (11), said cutting edge being inclined with respect to said cutting direction (20) and said axial plane (29), said second side face (22) supporting said cutting insert (6) relative to said shaft against cutting pressures exerted on said cutting edge (11).

5. The tool according to claim 4, wherein said plate body is inclined with respect to said cutting direction (20) and said axial plane (29).

6. The tool according to claim 1, wherein at least one of said first and second side faces (22, 23) is substantially planar.

7. The tool according to claim 5, wherein said plate body has a substantially planar surface adjoining said first and second side faces (22, 23) of said plate section.

8. The tool according to claim 4, wherein said median plate plane (28) is substantially parallel to said axial plane (29).

9. The tool according to claim 4, wherein said median plate plane (28) is displaced with respect to said axial plane (29) in said cutting direction (20).

10. The tool according to claim 1, wherein on said edge face (31) said first side face provides said cutting edge and said second side face provides a second cutting edge.

11. The tool according to claim 4, wherein said cutting insert (6) is turnable, said cutting insert having said cutting edge (11) and a second cutting edge, said first and second side faces (22, 23) each providing a support surface for alternately supporting said cutting insert (6) on said insert reception (5) against cutting pressures on an opposing one of said cutting edge and said second cutting edge.

12. The tool according to claim 1, wherein said longitudinal edge extension (30) is substantially linear.

13. The tool according to claim 4, wherein said cutting edge (11) is inclined by a pitch degree with respect to said shaft axis (3), said pitch degree being substantially constant along said longitudinal extension of said cutting edge.

14. The tool according to claim 4, wherein said tool shaft (2) has a free tool end (26) freely projecting during operation and a holding end (2) opposite said free tool end (26), said cutting edge (11) defining a front cutting end (26) and a rear cutting end (27) located closer to said holding end (2) than said front cutting end (26), said breast face (12) at least partly trailing towards said front cutting end (26).

15. The tool according to claim 1, wherein said cutting profiles (14, 15) extend substantially continuously across said thickness.

16. The tool according to claim 1, wherein said cutting edge (11) is a first longitudinal edge of said edge face (31) and a second cutting edge is a second longitudinal edge of said edge face, said second longitudinal edge being opposite said first longitudinal edge.

17. The tool according to claim 1, wherein said cutting edge and a second cutting edge are coplanar.

18. A profile cutting tool (1) for cutting workpiece profiles, comprising:
a cutting insert (6) provided by a plate body, said plate body having a plate section, said plate section having a substantially constant thickness extension, said plate body having plate surfaces including an edge face (31) and first and second side faces (22, 23) connecting to said edge face (31), said first and second side faces being larger than said edge face, said edge face and at least one of said first and second side faces providing a single cutting edge (11) at their junction and a cutting breast face (12), said plate body defining a median plate plane (28) between said side faces (22, 23), said edge face (31) being oriented substantially at right angles to said median plate plane (28), said edge face providing a back face (13) adjacent said cutting edge (11), said cutting edge (11) defining a longitudinal edge extension (30), said cutting edge (11) and said edge face (31) providing cutting profiles (14, 15) including at least one profile projection (14) and at least one profile depression (15), said cutting profiles (14, 15) having a longitudinal profile extension, said longitudinal profile extension being transverse to said median plate plane (28), wherein said longitudinal profile extension is inclined with respect to said longitudinal edge extension (30) by an angle of less than 30°.

* * * * *